US009891377B2

(12) United States Patent
Saito et al.

(10) Patent No.: US 9,891,377 B2
(45) Date of Patent: Feb. 13, 2018

(54) MULTICORE FIBER AND OPTICAL CABLE

(71) Applicants: FUJIKURA LTD., Tokyo (JP); NATIONAL UNIVERSITY CORPORATION HOKKAIDO UNIVERSITY, Sapporo-shi, Hokkaido (JP)

(72) Inventors: Shota Saito, Sakura (JP); Katsuhiro Takenaga, Sakura (JP); Kunimasa Saitoh, Hokkaido (JP); Takeshi Fujisawa, Hokkaido (JP)

(73) Assignees: FUJIKURA LTD., Tokyo (JP); NATIONAL UNIVERSITY CORPORATION HOKKAIDO UNIVERSITY, Sapporo-shi, Hokkaido (JP)

( * ) Notice: Subject to any disclaimer, the term of this patent is extended or adjusted under 35 U.S.C. 154(b) by 0 days.

(21) Appl. No.: 15/314,801

(22) PCT Filed: Feb. 8, 2016

(86) PCT No.: PCT/JP2016/053652
§ 371 (c)(1),
(2) Date: Nov. 29, 2016

(87) PCT Pub. No.: WO2016/132942
PCT Pub. Date: Aug. 25, 2016

(65) Prior Publication Data
US 2017/0199325 A1    Jul. 13, 2017

(30) Foreign Application Priority Data
Feb. 18, 2015 (JP) .................................. 2015-030082

(51) Int. Cl.
*G02B 6/02* (2006.01)

(52) U.S. Cl.
CPC ................................ *G02B 6/02042* (2013.01)

(58) Field of Classification Search
CPC .................................................. G02B 6/02042
See application file for complete search history.

(56) References Cited

U.S. PATENT DOCUMENTS

| 6,826,343 B2 | 11/2004 | Davis et al. |
| 2011/0188855 A1 | 8/2011 | Kokubun et al. |

(Continued)

FOREIGN PATENT DOCUMENTS

| JP | 2011-150133 A | 8/2011 |
| JP | 2013-020074 A | 1/2013 |

(Continued)

OTHER PUBLICATIONS

Akira Igari, et al., "An Analysis of transmission characteristics of homogeneously coupled-three-core fiber based on full-vector finite-element method and coupled field theory", IEICE, Feb. 12, 2015, pp. 121-126, vol. 114, No. 453.
Cen Xia, et al., "Supermodes for optical transmission", Optic Express, 2011, pp. 16653-16664, vol. 19, No. 17.
R. Ryf, et al., "Impulse Response Analysis of Coupled-Core 3-Core Fibers", ECOC Technical Digest-Mo. 1F.4.pdf, 2012.
(Continued)

*Primary Examiner* — John M Bedtelyon
(74) *Attorney, Agent, or Firm* — Sughrue Mion, PLLC (57) ABSTRACT

A multicore fiber including two or more cores each capable of single mode transmission, a cladding covering around the two or more cores in common, and a low refractive index portion having a refractive index lower than a refractive index of the cladding, wherein a cross-section perpendicular to a longitudinal direction includes a region where two or more cores of a part or all of the two or more cores are arranged in a circular shape and at least a part of the low refractive index portion is arranged inside an inscribed circle of the cores included in the region.

5 Claims, 7 Drawing Sheets

(56) References Cited

U.S. PATENT DOCUMENTS

| | | | |
|---|---|---|---|
| 2011/0206330 A1 | 8/2011 | Sasaoka | |
| 2013/0016949 A1* | 1/2013 | Yao | G02B 6/02042 385/126 |
| 2013/0039627 A1 | 2/2013 | Li et al. | |
| 2013/0044988 A1 | 2/2013 | Tanigawa et al. | |
| 2013/0044989 A1 | 2/2013 | Tanigawa et al. | |
| 2013/0301998 A1 | 11/2013 | Hayashi | |
| 2013/0302002 A1 | 11/2013 | Imamura | |
| 2016/0028206 A1 | 1/2016 | Watanabe et al. | |

FOREIGN PATENT DOCUMENTS

| | | |
|---|---|---|
| JP | 5117636 B1 | 1/2013 |
| JP | 2013-040078 A | 2/2013 |
| JP | 2013-041148 A | 2/2013 |
| WO | 2010/038861 A1 | 4/2010 |
| WO | 2013/161825 A1 | 10/2013 |
| WO | 2014/132990 A1 | 9/2014 |
| WO | 2014/197052 A2 | 12/2014 |

OTHER PUBLICATIONS

R. Ryf, et al., "1705-km Transmission over Coupled-Core Fibre Suporting 6 Spatial Modes", ECOC 2014, 2014, PD.3.2.

Kunimasa Saitoh, et al., "Full-Vectorial Imaginary-Distance Beam Propagation Method Based on a Finite Element Scheme: Application to Photonic Crystal Fibers", IEEE, Journal of Quantum Electronics, Jul. 2002, pp. 927-933, vol. 38, No. 7.

Adrian A. Juarez, et al., "Modeling of Mode Coupling in Multimode Fibers with Respect to Bandwidth and Loss", Journal of Lightwave Technology, Apr. 15, 2014, pp. 1549-1558, vol. 32, No. 8.

Joel Carpenter, et al., "First demonstration of principal modes in a multimode fibre" ECOC 2014, PD.2.1, Sep. 2014.

Written Opinion for PCT/JP2016/053652 dated Mar. 1, 2016 [PCT/ISA/237].

Japanese Office Action of 2015-030082 dated Nov. 1, 2016.

Communication dated May 30, 2017 from the Japanese Patent Office in counterpart Application No. 2015-030082.

* cited by examiner

MULTICORE FIBER AND OPTICAL CABLE

CROSS REFERENCE TO RELATED APPLICATIONS

This application is a National Stage of International Application No. PCT/JP2016/053652 filed Feb. 8, 2016, claiming priority based on Japanese Patent Application No. 2015-030082 filed Feb. 18, 2015, the contents of all of which are incorporated herein by reference in their entirety.

TECHNICAL FIELD

The present invention relates to a multicore fiber and an optical cable using the multicore fiber.

The present application claims the priority based on Japanese Patent Application No. 2015-030082 filed in Japan on Feb. 18, 2015, the contents of which are hereby incorporated herein.

BACKGROUND ART

In order to handle increasing communication traffic in recent years, a further increase in communication (transmission) capacity is desired. In optical communication systems using a single mode fiber (SMF) used for conventional optical communication, however, a limit to increasing capacity is predicted. As a technique to overcome the limit, active research and development of space division multiplexing have been carried out.

Optical fibers for space division multiplexing include few-mode fibers (FMFs), where a capacity is increased by propagating a plurality of modes within one core and placing signals on each of the modes, and multicore fibers (MCFs) where a capacity is increased by placing signals on each of a plurality of cores (see Patent Documents 1 to 6 for MCFs).

Basically, the MCFs are roughly classified into two types of uncoupled MCFs where each core individually transmits information and coupled multicore fibers (C-MCFs) where (modes of) respective cores are coupled and thereby form a super-mode and information is transmitted by each super-mode (see Non-Patent Documents 1 to 3 for C-MCFs).

Especially in few-mode transmission, mitigating a differential mode group delay (DMGD) among propagation modes is important for shortening calculation time of signal processing such as multiple-input and multiple-output (MIMO). In the C-MCF, examination on enhancing coupling of super-modes in order to mitigate a DMGD has been carried out and has recently been attracting attention (see Non-Patent Documents 2 and 3).

PRIOR ART DOCUMENTS

Patent Documents

[Patent Document 1] PCT International Publication No. WO 2010/038861
[Patent Document 2] Japanese Unexamined Patent Application, First Publication No. 2011-150133
[Patent Document 3] Japanese Unexamined Patent Application, First Publication No. 2013-40078
[Patent Document 4] Japanese Unexamined Patent Application, First Publication No. 2013-41148
[Patent Document 5] PCT International Publication No. WO 2013/161825
[Patent Document 6] Japanese Patent No. 5117636

Non-Patent Document

[Non-Patent Document 1] C. Xia, et al., "Supermodes for optical transmission," Optics Express, Vol. 19, No. 17, pp. 16653-16664, 2011
[Non-Patent Document 2] R. Ryf, et al., "Impulse Response Analysis of Coupled-Core3-Core Fibers," ECOC2012, Mo.1.F.4, 2012
[Non-Patent Document 3] R. Ryf, et al., "1705-km Transmission over Coupled-Core Fibre Supporting 6 Spatial Modes," ECOC2014, PD.3.2, 2014

DISCLOSURE OF INVENTION

Problems to be Solved by the Invention

In a C-MCF, super-modes are strongly coupled, that is, a difference of effective refractive indices ($n_{eff}$) between the super-modes ($\Delta n_{eff}$) is small and thus a DMGD can be mitigated (see Non-Patent Document 2). In order to reduce $\Delta n_{eff}$ in conventional C-MCFs, however, a core pitch has to be broadened to some extent. For example in Non-Patent Document 2, an example of a three-core C-MCF having a core pitch of 29 μm is reported. Broadening a core pitch leads to less spatial efficiency and thus a configuration that allows for a narrower core pitch is required.

In addition, assuming that each of cores in an uncoupled MCF is a C-MCF (similarly to this, a region including two or more cores that may be coupled with each other), it is desirable to make a core pitch of the C-MCF narrower in order to mitigate crosstalk among the cores of the uncoupled MCF (that is to broaden a core pitch of the uncoupled MCF).

The present invention has been made in consideration of the aforementioned circumstances with an object to provide a multicore fiber capable of suppressing a DMGD even with a core pitch narrower than that in the conventional art and optical cable using the multicore fiber.

Means for Solving the Problems

A first aspect of the present invention is a multicore fiber including two or more cores each capable of single mode transmission, a cladding covering the two or more cores in common, and a low refractive index portion having a refractive index lower than a refractive index of the cladding, wherein a cross-section perpendicular to a longitudinal direction includes a region where two or more cores of a part or all of the two or more cores are arranged in a circular shape, and at least a part of the low refractive index portion is arranged inside an inscribed circle of the cores included in the region.

A second aspect of the present invention may be the multicore fiber according to the first aspect, wherein the multicore fiber is a coupled multicore fiber.

A third aspect of the present invention may be the multicore fiber according to the first aspect, including two or more regions where the two or more cores are arranged in a circular shape, wherein at least one of the regions includes the low refractive index portion, and the two or more cores in the region are coupled.

A fourth aspect of the present invention may be the multicore fiber according to any one of the first to third aspects, wherein the low refractive index portion is a hole.

A fifth aspect of the present invention is an optical cable, at least a part of the optical cable including the multicore fiber according to any one of the first to fourth aspects.

Effects of the Invention

According to the aspects of the present invention described above, it is possible to reduce the difference of effective refractive indices ($\Delta n_{eff}$) among super-modes, and therefore, a DMGD can be reduced even when a distance between the cores is narrow. Also, under conditions of an equivalent core distance, the DMGD can be further mitigated.

EMBODIMENTS FOR CARRYING OUT THE INVENTION

Hereinafter, the present invention will be described based on preferable embodiments with reference to the drawings.

Figure 1A:
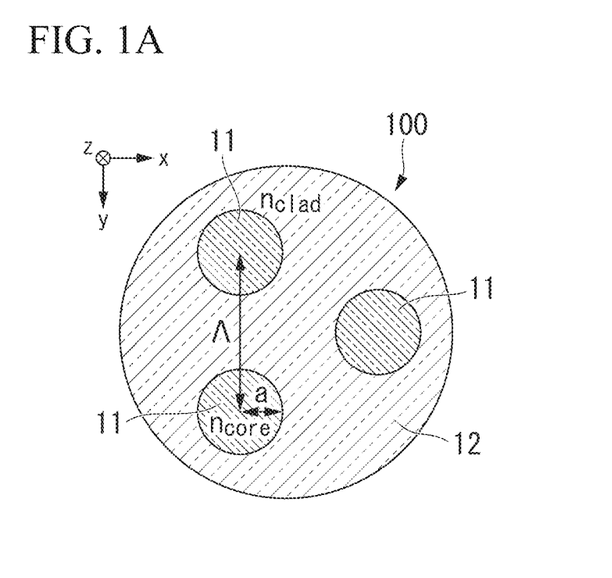
FIG. 1A is a cross-sectional view showing an exemplary multicore fiber without a hole.
Figure 1B:
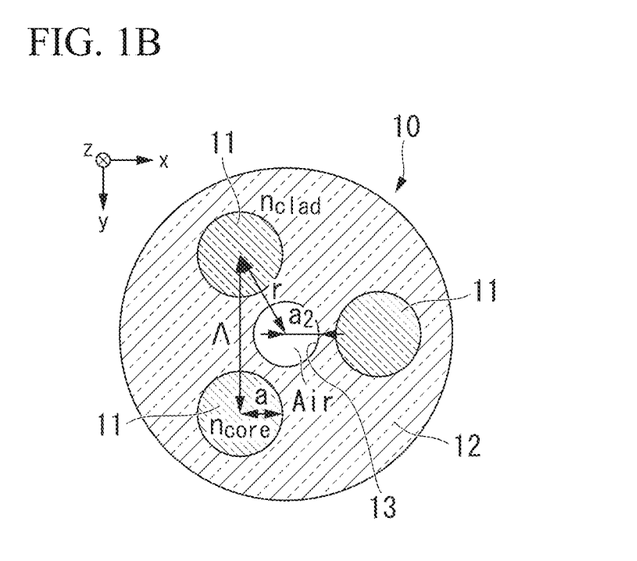
FIG. 1B is a cross-sectional view showing an exemplary multicore fiber with a hole.

FIGS. 1A and 1B show cross-sectional views of homogeneous three-core C-MCFs. FIG. 1A shows a multicore fiber 100 without a hole and FIG. 1B shows a multicore fiber 10 added with a hole (low refractive index portion 13). Here, a radius of a core 11 is denoted as a, core pitch (distance between core centers) as A, refractive index of the core 11 as $n_{core}$, and refractive index of cladding 12 as $n_{clad}$. The refractive index $n_{core}$ of the core 11 is larger than the refractive index $n_{clad}$ of the cladding 12. Also in FIG. 1B, the distance between centers of the core 11 and a low refractive index portion 13 is denoted as r.

All of the cores 11 are capable of single mode transmission in a transmission band. The cladding 12 is common cladding covering around two or more cores 11. The two or more cores 11 are homogeneous. An effective refractive index of each of the cores is preferably at a similar level. The low refractive index portion 13 is formed by a medium having a refractive index lower than that of the cladding 12. The medium forming the low refractive index portion 13 may be a solid matter, liquid matter, or gaseous matter. The low refractive index portion 13 of a solid matter can be formed by inserting a rod-shaped member into the cladding. The low refractive index portion 13 of a fluid (liquid matter or gaseous matter) can be formed as a hole in the cladding 12. The gaseous matter in the hole may be the air and introduced from the air outside the MCF into the hole. Inside the hole may be a vacuum.

Figure 2:
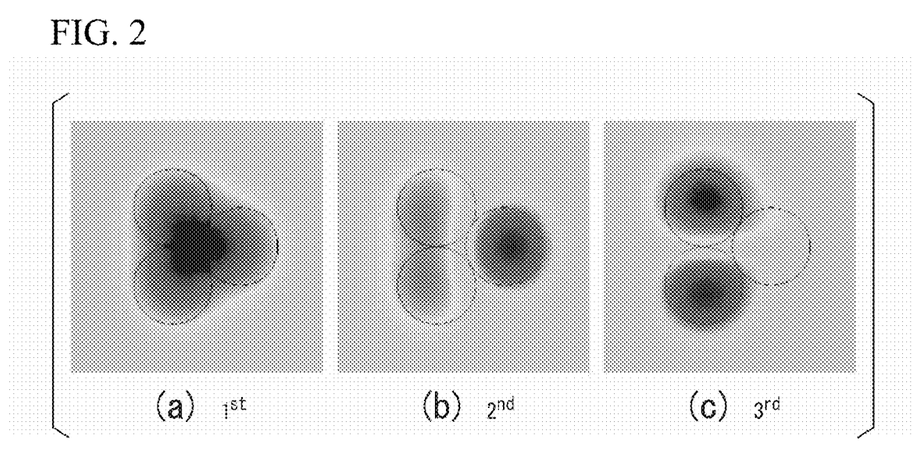
FIG. 2 is a schematic diagram (substitute pictures for diagrams) showing exemplary field distributions of a homogeneous three-core C-MCF of (a) a first order super-mode, (b) a second order super-mode, and (c) a third order super-mode, respectively.

In a cross-section perpendicular to a longitudinal direction of the multicore fiber 10, two or more cores 11 are arranged in a circular shape. A three-core C-MCF includes three cores. FIG. 2 shows exemplary field distributions of a homogeneous three-core C-MCF in alignment. In a three-core C-MCF, there are three super-modes when each of the cores operates in a single mode. FIGS. 2(a), 2(b), and 2(c) show a first order super-mode ($1^{st}$), second order super-mode ($2^{nd}$), and third order super-mode ($3^{rd}$), respectively. In the basic (first order) super-mode, electric fields of the three cores have the same sign while in the higher order (second or third order) super-mode a node where a sign of electric field is inversed is formed between the cores. Among these, the effective refractive index $n_{eff}$ of the basic super-mode is the highest and $n_{eff}$ of the higher order super-mode is lower than $n_{eff}$ of the basic super-mode.

In the basic super-mode, power is distributed in the center of the C-MCF while in the higher order super-mode no power exists in the center of the C-MCF unlike in the basic super-mode. Therefore, providing a low refractive index portion in the region where the power exists in the basic super-mode unlike in the higher order super-mode results in a drastic decrease in $n_{eff}$ of the basic super-mode as compared to $n_{eff}$ of the higher order super-mode. As a result, a difference $\Delta n_{eff}$ of $n_{eff}$ among the super-modes becomes smaller, thereby allowing for enhancing of a mode coupling of the super-modes. As a result, when a DMGD of a similar level to that of a C-MCF without a low refractive index portion is to be obtained, spatial efficiency can be enhanced by a smaller core pitch. Furthermore, when a core pitch of a similar level to that of a C-MCF without a low refractive index portion is provided, a DMGD can be further lowered.

A DMGD of an MCF is preferably, for example, 500 ps/km or less and more preferably 200 ps/km or less.

Preferably, at least a part of the low refractive index portion is arranged inside a circumscribed circle of the plurality of cores arranged in a circular shape. Further preferably, at least a part of the low refractive index portion is arranged inside an inscribed circle of the plurality of cores arranged in the circular shape. In the case of FIG. 1B, a circumscribed circle has a radius of r+a/2 while an inscribed circle has a radius of r−a/2. Preferably, the low refractive index portion includes the center of the inscribed circle. All of the low refractive index portion may be arranged inside the inscribed circle. The center of the low refractive index portion may correspond to the center of the inscribed circle. Preferably, the low refractive index portion is not in contact with the cores and the cladding covers around the low refractive index portion. When there is no such circle that is inscribed inside all of the cores (outer circumference) arranged in a circular shape, it is preferable that at least a part of the low refractive index portion is arranged inside a circle having a largest radius interior to these cores.

The example in FIG. 1B shows an MCF having one region including a plurality of cores arranged in a circular shape (coupled core region); however, the present invention is not limited to this case. The respective cores may be homogeneous or inhomogeneous. An MCF may include two or more coupled core regions or include one or more coupled core regions and one or more uncoupled cores. Here, the coupled core region refers to a region where super-modes generated among the plurality of cores included in the region can be used for transmission. Also, the uncoupled core includes a single core and has an independent transmission mode with respect to other cores.

In an MCF including two or more coupled core regions, a transmission mode is independent between the coupled core regions (that is, the respective regions are uncoupled). In the MCF including two or more coupled core regions, it is preferable that one or more coupled core regions thereof include a low refractive index portion. This allows a core pitch within the region to be smaller in the coupled core region with the low refractive index portion and a core pitch between the regions to be larger, and therefore, crosstalk between the regions can be reduced.

The present invention has been described above based on the preferable embodiments; however, the present invention is not limited to the aforementioned embodiments but may include various variations without departing from the principals of the present invention.

An MCF of the present invention may be used as a part or all of an optical fiber used for optical transmission line, optical waveguide, optical cable, or the like. Preferably, at least a part of the optical cable includes an MCF of the present invention.

A medium forming cores and cladding of the MCF may be silica based glass (silica glass), multicomponent glass, plastic, or the like. The silica based glass includes pure silica glass that does not include an additive and silica based glass that includes an additive. The additive may be one or two or more of Ge, Al, P, B, F, Cl, alkali metals, and the like.

Similar to a FMF, a mode coupling occurs in a C-MCF due to various perturbation (micro bend, twisting, etc.) in a transmission line and thus MIMO processing may be required in the reception side as in normal MDM transmission. Here, there is a possibility that an increased computation in the MIMO processing due to a DMGD among super-modes may be an issue. Therefore, using the multicore fiber of the present invention with a mitigated DMGD allows for reducing a burden of signal processing such as MIMO or the like.

A wavelength bandwidth used for transmission by the MCF is not specifically limited but may be the C band (1530 to 1565 nm), L band (1565 to 1625 nm), or the like. Conditions for single mode operations in a wavelength bandwidth in use preferably satisfy a single mode operation condition of $v \leq 2.405$ with a normalized frequency of $v=2\pi a (n_{core}^2-n_{clad}^2)^{1/2}/\lambda$. An upper limit of core radius, where a differential relative refractive index $\Delta=(n_{core}^2-n_{clad}^2)/(2n_{core}^2)$ is 0.05% or more and $v \leq 2.405$ holds in the C+L bands, is approximately 13 µm. A value $\Delta$ where $v \leq 2.405$ holds with each core radius can be automatically determined. Incidentally, $\lambda$ shows a wavelength and $2\pi/\lambda$ shows a wave number $k_0$ (see Examples to be described later).

Moreover, with a radius a or $\Delta$ where $v \geq 2.405$ holds, a transmission loss in a high order mode of $LP_{11}$ mode or higher may be $\alpha_{Loss}$ or more. Here, $\alpha_{Loss} > 0$ dB/m holds and $\alpha_{Loss}$ may be for example 0.1 dB/m, 0.5 dB/m, 1.0 dB/m, or 2.0 dB/m. A cable cutoff wavelength $\lambda_{cc}$ of the fiber may be for example 1260 nm or less or 1000 nm or less.

Generally, the coupling constant of a fiber type directional coupler is dependent on a normalized frequency v (or V) when a, $\Delta$ and $\Lambda$ are constant. When a wavelength $\lambda$ varies within a range of C+L bands, variation of a value of v is approximately 0.15 at the maximum and thus a value of the coupling constant does not greatly vary. When a core radius a and differential relative refractive index $\Delta$ are constant, the coupling constant of a fiber type directional coupler decreases exponentially as $\Lambda/a$ increases.

In this manner, a C-MCF becomes more like a normal FMF when $\Lambda/a$ is too small and more like an uncoupled MCF when $\Lambda/a$ is too large. A lower limit of $\Lambda/a$ may be 2.0, 2.2, 2.4, 2.6, 2.8, or 3.0. Also, an upper limit of $\Lambda/a$ may be 5.0, 5.2, 5.4, 5.6, 5.8, or 6.0. A value of $\Lambda/a$ may be an appropriate value such as 3.2, 3.5, 4.0, 4.5, or 4.8. The shortest distance between adjacent cores $(\Lambda-2a)$ should satisfy $\Lambda-2a \geq 0$ µm and may be for example 0.1 µm, 0.3 µm, 0.5 µm, 0.7 µm, or 1.0 µm.

A radius $a_2$ of a low refractive index medium (hole and the like) is not specifically limited but should satisfy $a_2 > 0$ µm. A lower limit of $a_2$ may be for example 0.1 µm, 0.25 µm, 0.5 µm, 0.7 µm, 1.0 µm, 1.5 µm, 2.0 µm, 2.5 µm, or 3.0 µm. The shortest distance between the core and low refractive index portion $(r-a-a_2)$ should satisfy $r-a-a_2 \geq 0$ µm and may be for example 0.1 µm, 0.3 µm, 0.5 µm, 0.7 µm, or 1.0 µm.

EXAMPLES

Here, transmission characteristics of a homogeneous three-core coupled fiber for mode division multiplex transmission were analyzed and super-mode characteristics (effective refractive index, group delay) of an MCF were evaluated by full-vector finite element analysis (see for example, K. Saitoh and M. Koshiba, "Full-vectorial imaginary-distance beam propagation method based on a finite element scheme: application to photonic crystal fibers," IEEE J. Quantum Electronics, vol. 38, no. 7, pp. 927-933, July 2002). Furthermore, it is shown that adding a hole in the center allows for mitigating a differential effective refractive index among the super-modes and enhancing a mode coupling, thereby reducing a differential mode group delay as well as reducing a core pitch. Moreover, a mode coupling due to micro bend in a transmission line has been evaluated using a field coupling theory and it was made clear that, in a strong coupling state with large perturbation due to micro bend, a fiber having a smaller differential effective refractive index among modes tended to result in a mode coupling with slight perturbation, thereby resulting in an even smaller differential mode group delay.

Analysis was performed as follows on a homogeneous three-core C-MCF not including a low refractive index portion in the center as shown in FIG. 1A and a homogeneous three-core C-MCF including a hole as the low refractive index portion in the center as shown in FIG. 1B. Here, a radius of the core 11 is denoted as a, the refractive index of the core 11 is denoted as $n_{core}$, and the refractive index of cladding 12 is denoted as $n_{clad}$. In the examples shown, the respective cores 11, 11, and 11 are arranged at vertices of an equilateral triangle having the centroid thereof at the center of the fiber.

The refractive indices of the core and cladding were calculated from the Sellmeier equation with consideration of dependency on wavelength. When the hole is added, the hole radius is denoted as $a_2$ and the refractive index of the hole is denoted as 1.0. Furthermore, the distance between centers of the cores is denoted as $\Lambda$ and the distance between the center of the hole (here, the center of the fiber) and the center of each of the cores is denoted as r. Moreover, the differential relative refractive index of the core with respect to the cladding is expressed as $\Delta=(n_{core}^2-n_{clad}^2)/(2n_{core}^2)$ and a value V of normalized frequency is expressed as $V=k_0 a (n_{core}^2-n_{clad}^2)^{1/2}$. Here, $k_0$ shows a wave number in free space.

As parameters for the homogeneous three-core C-MCF without a low refractive index portion in the center, parameters of the 3CF29 in Non-patent Document 2 (ECOC2012, Mo.1.F.4) were used. That is, a=6.2 µm, V=2.22, and $\Lambda$=29 µm were used. As described in the above, the three-core C-MCF has three propagation modes, which are referred to as the first order, second order, and third order super-modes, respectively (in FIGS. 8 to 11 and 13, as mode 1, mode 2, and mode 3, respectively).

A DMGD and $\Delta n_{eff}$ between the first order and $m^{th}$ order super-modes are defined as $DMGD=\tau_{mth}-\tau_{1st}$ and $\Delta n_{eff}=n_{eff\_mth}-n_{eff\_1st}$, respectively. Here, $\tau_{1st}$ and $\tau_{mth}$ show group delay time of the first order and mth order modes, respectively, and $n_{eff\_1st}$ and $n_{eff\_mth}$ show effective refractive indices of the first order and mth order modes, respectively. In the 3CF29, DMGD=212 ps/km and $\Delta n_{eff}=8.37\times 10^{-6}$.

It is shown that adding the hole in the center of this fiber as shown in FIG. 1B results in mitigation of DMGD and $\Delta n_{eff}$ and enhanced a mode coupling, thereby further allowing for reducing a core pitch $\Lambda$ and enhancing spatial efficiency.

Figure 3:
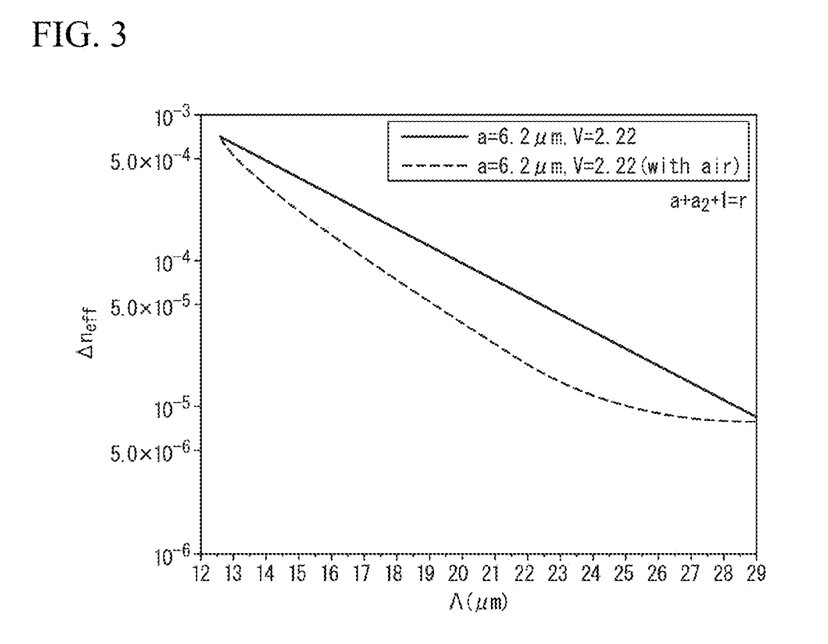
FIG. 3 is a graph showing an exemplary core-pitch dependency of $\Delta n_{eff}$ in a homogeneous three-core C-MCF.

FIG. 3 shows core-pitch dependency of $\Delta n_{eff}$ in a homogeneous three-core C-MCF. Core parameters include a=6.2 µm and V=2.22. A solid line shows the case without a hole while a dotted line shows the case with the hole (air). The hole radius $a_2$ varies such that $a+a_2+1=r$ is satisfied, that is, the shortest distance between the core and hole is always 1 µm. FIG. 3 shows that increasing $\Lambda$ allows for mitigating $\Delta n_{eff}$ in both cases of adding the hole and not adding a hole. This is because an increased core pitch results in weaker coupling among the cores and each of the super-modes approaches to a mode where each of the cores is isolated. Also, it is shown that adding the hole allows for mitigating $\Delta n_{eff}$ more than in the case of not adding a hole.

In the second order and third order super-modes, an electric field in the center of the fiber is always zero regardless of with or without the hole due to symmetry of the super-modes as shown in FIGS. 2(b) and 2(c). On the other hand, FIG. 2(a) shows that an electric field in the center of the fiber has a large value in the basic super-mode. Therefore, adding the hole in the center of the fiber allows for reducing field intensity in the center of the fiber in the basic super-mode without substantially influencing an electric field distribution in the higher order super-mode. This allows for mitigating a difference of effective refractive indices between the basic (first order) super-mode and higher order (second or third order) super-mode.

Figure 4:
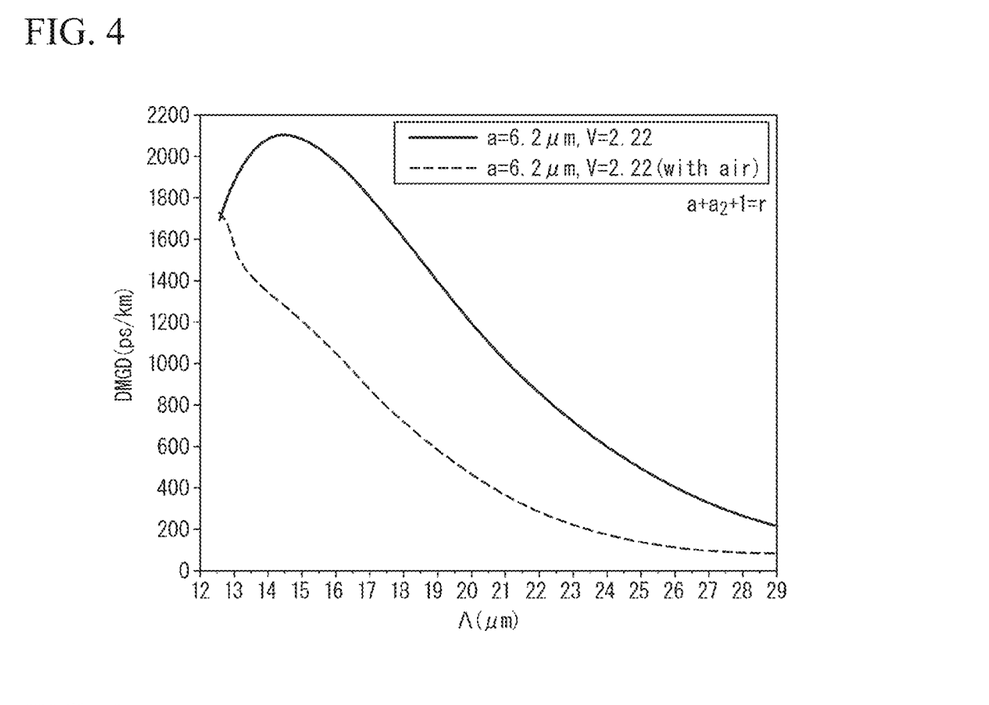
FIG. 4 is a graph showing an exemplary core-pitch dependency of DMGD in a homogeneous three-core C-MCF.

FIG. 4 shows core-pitch dependency of DMGD in a homogeneous three-core C-MCF. The respective parameters are similar to those in FIG. 3. As in FIG. 3, FIG. 4 shows that increasing $\Lambda$ allows for always mitigating DMGD in both cases of adding the hole and not adding a hole and that adding the hole can further mitigate the DMGD. This may be an effect of mitigated $\Delta n_{eff}$.

Figure 5:
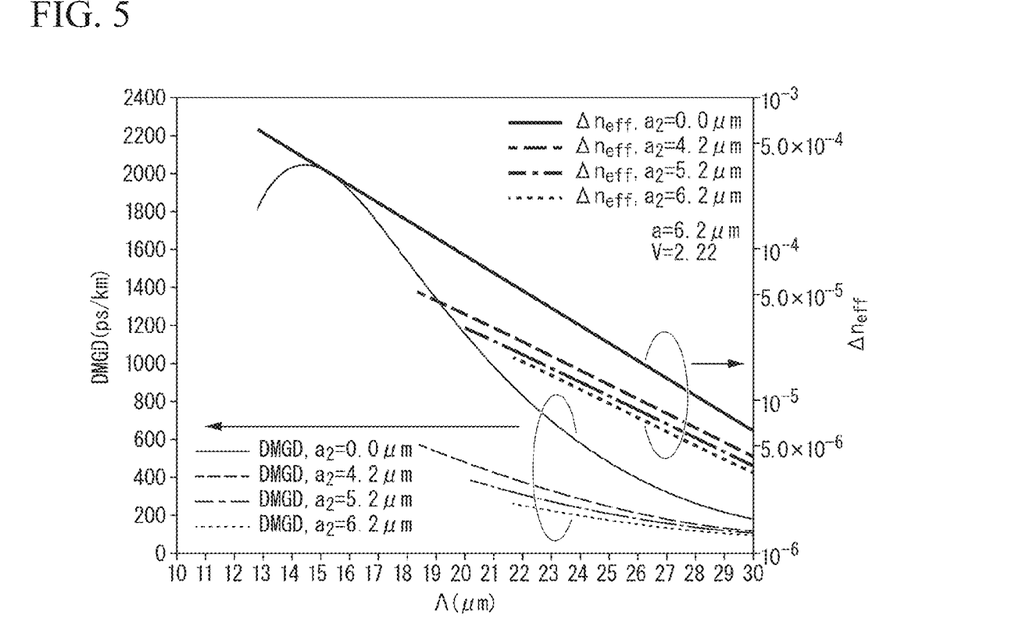
FIG. 5 is a graph showing an exemplary core-pitch dependency of DMGD and $\Delta n_{eff}$ in a homogeneous three-core C-MCF.

FIG. 5 shows core-pitch dependency of DMGD and $\Delta n_{eff}$ in a homogeneous three-core C-MCF. A vertical axis on the left shows DMGD while a vertical axis on the right shows $\Delta n_{eff}$. A solid line, broken line, alternate long and short dash line, and dotted line show cases with a hole radius $a_2$ of 0.0 µm, 4.2 µm, 5.2 µm, and 6.2 µm, respectively. Note that the smallest values of core pitch $\Lambda$ with the respective values $a_2$ are 12.4 µm, 18.0 µm, 19.8 µm, and 21.5 µm, respectively. The smallest value is obtained because the cores or the core and hole are in contact with each other. Here, the smallest value of $\Lambda$ in the homogeneous three-core C-MCF is 2a without a hole and $(a+a_2)$ multiplied by $\sqrt{3}$ with the hole.

FIG. 5 shows that a larger $a_2$ results in smaller DMGD and $\Delta n_{eff}$. This effect is notable in a configuration with a small core pitch $\Lambda$ and strong field distribution in the center of the fiber. For comparison with the fiber of 3CF29 ($\Lambda$=29.0 µm, DMGD=212 ps/km), comparison with a configuration where $\Delta n_{eff}$ is $8.37\times 10^{-6}$ resulted in core pitches of $\Lambda$=27.0, 26.3, and 25.7 µm for the respective fibers with $a_2$=4.2, 5.2, and 6.2 µm, respectively. Here, DMGDs are 179, 171, and 167 ps/km, respectively. This shows that adding the hole may result in a configuration that allows for small DMGD and core pitch with $\Delta n_{eff}$ equivalent to that of the fiber without a hole.

Similarly, there is a configuration that allows for small $\Delta n_{eff}$ and DMGD with the same core pitch. This shows that adding a hole in the center of a three-core C-MCF allows for mitigating a difference of effective refractive indices among the super-modes and enhancing a mode coupling, thereby reducing a differential mode group delay as well as reducing a core pitch.

Next, evaluation on a DMGD of the homogeneous three-core C-MCF will be described considering a mode coupling due to micro bend.

Coupling among modes attributable to micro bend in the fiber and variations of DMGD caused by the coupling are examined. The analysis model is described below.

Figure 6:
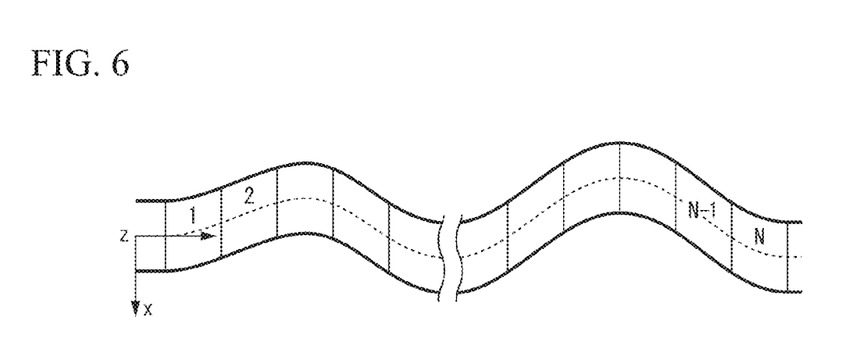
FIG. 6 is a schematic diagram of a fiber divided into N segments in a longitudinal direction.

First, the entire fiber is divided into N segments (i=1, 2, . . . , N) as in FIG. 6 and a state where micro bend exists on an x-y plane in each of the segments is assumed with bend radiuses in the x direction and y direction denoted as $R_x$ and $R_y$, respectively. A longitudinal direction along the fiber is denoted as the z direction while two directions perpendicular thereto are denoted as the x and y directions.

Figure 7A:
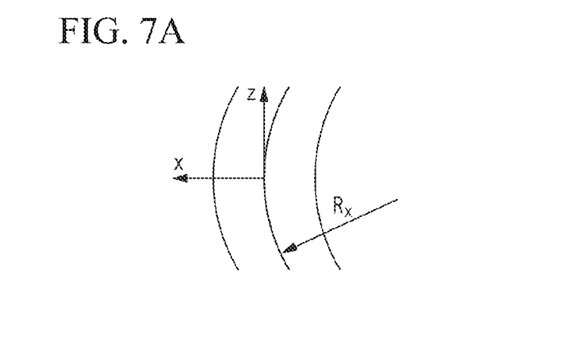
FIG. 7A is a schematic diagram showing a micro bend in an x direction.
Figure 7B:
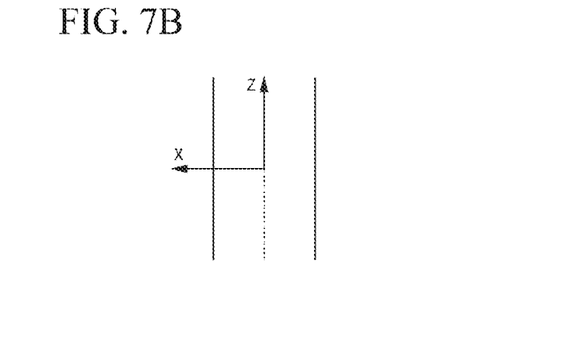
FIG. 7B is a schematic diagram showing an equivalent linear waveguide.
Figure 7C:
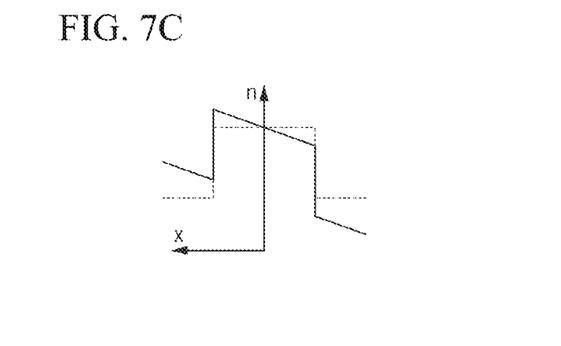
FIG. 7C is a schematic diagram showing a distribution of refractive indices of the equivalent linear waveguide.
Figure 8:
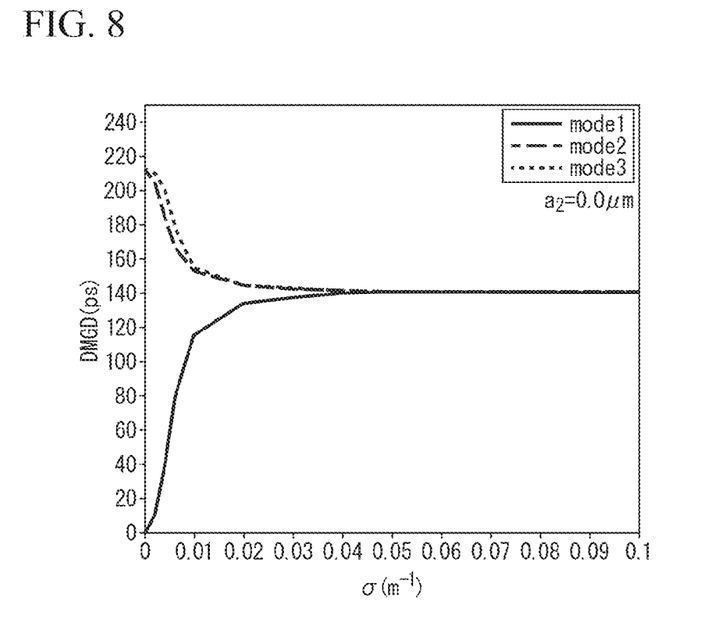
FIG. 8 is a graph showing an exemplary dependency of DMGD on $\sigma$ in first order to third order super-modes in a homogeneous three-core C-MCF ($a_2$=0.0 μm).
Figure 9:
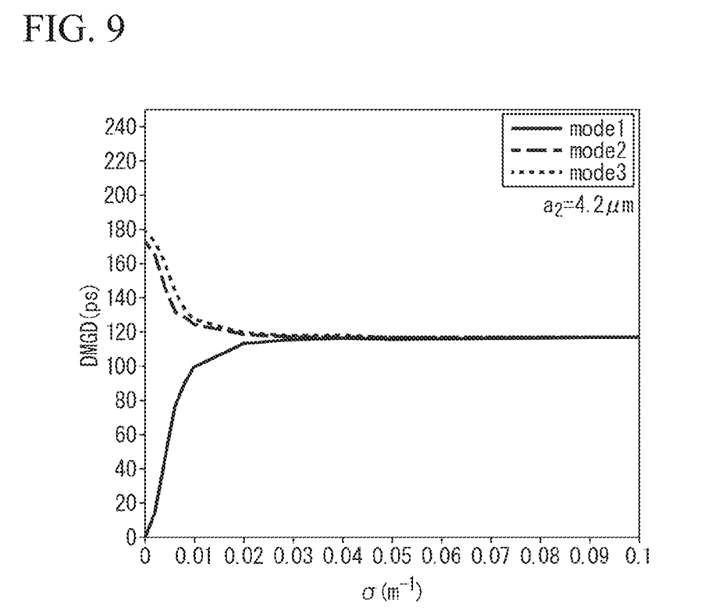
FIG. 9 is a graph showing an exemplary dependency of DMGD on $\sigma$ in first order to third order super-modes in a homogeneous three-core C-MCF ($a_2$=4.2 μm).
Figure 10:
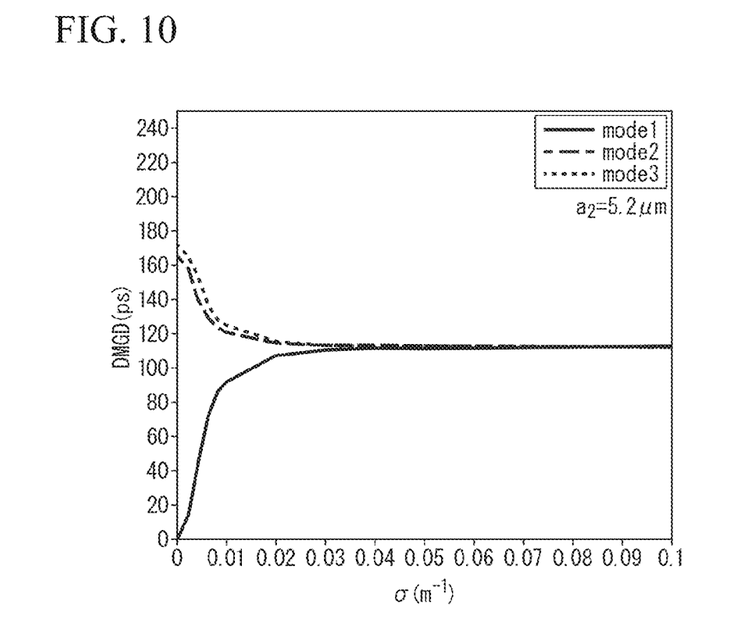
FIG. 10 is a graph showing an exemplary dependency of DMGD on $\sigma$ in first order to third order super-modes in a homogeneous three-core C-MCF ($a_2$=5.2 μm).
Figure 11:
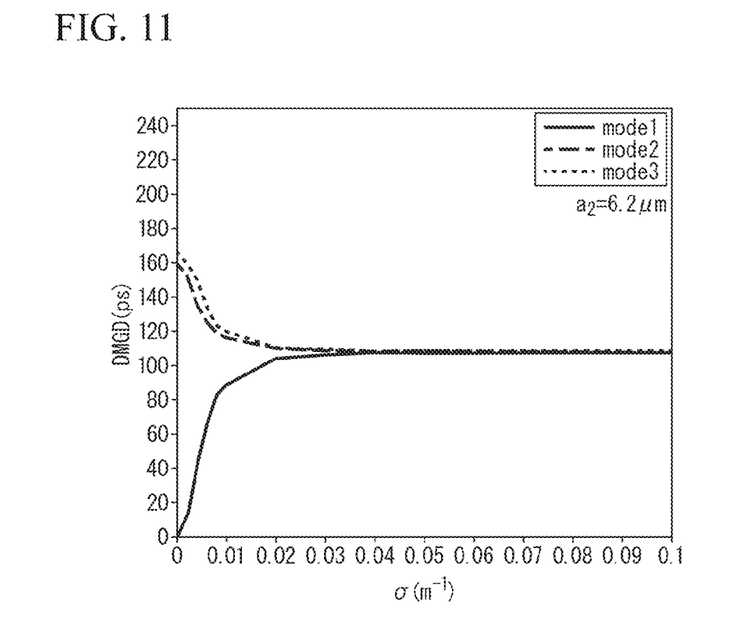
FIG. 11 is a graph showing an exemplary dependency of DMGD on $\sigma$ in first order to third order super-modes in a homogeneous three-core C-MCF ($a_2$=6.2 μm).

FIG. 7A is a schematic diagram of one of the segments assuming micro bend in the x direction. FIG. 7B shows an equivalent linear waveguide of FIG. 7A. FIG. 7C shows a refractive index distribution of FIG. 7B. FIG. 7A shows only an x-z plane for simplification. Values of bend radiuses $R_x$ and $R_y$ are given randomly such that a normal distribution where an average value $\mu$=0 m$^{-1}$ and standard deviation $\sigma=1/R_{x,y}$ m$^{-1}$ is satisfied. Where $\sigma$=0 m$^{-1}$, there is no influence of micro bend, which corresponds to a state where the fiber is linear. In FIG. 7C, a dotted line shows an equivalent refractive index distribution without bend and a solid line shows an equivalent refractive index distribution with bend.

Next, analysis based on the field coupling theory is described. An electric field E and a magnetic field H of a coupling system where the total number of modes is M are shown by following formulas (1) and (2).

Formula 1

$$E = \sum_{m=1}^{M} A_m E_m \quad (1)$$

Formula 2

$$H = \sum_{m=1}^{M} A_m E_m \quad (2)$$

Here, $A_m$ shows an amplitude of an $m^{th}$ order mode and $E_m$ and $H_m$ show an electric field and magnetic field (vector) of the $m^{th}$ order mode, respectively. From the formulas (1) and (2), coupling equations showing propagation of the respective modes in one of the segments are as expressed by formulas (3) and (4) according to the field coupling theory (see for example, A. Juarez et al., "Modeling of mode coupling in multimode fibers with respect to bandwidth and loss," Journal of Lightwave Technology, vol. 32, no. 8, pp. 1549-1558, April 2014.

Formula 3

$$\frac{dA_m}{dz} = -j\beta_m A_m - j\sum_{m \neq n} \kappa_{mn} A_m \quad (3)$$

Formula 4

$$\kappa_{mn} = \omega \varepsilon_0 \frac{\int\int (n_{bend}^2(x, y, R_x, R_y) - n_{nobend}^2(x, y))E_m^* \cdot E_n dxdy}{\int\int \vec{l_z} \cdot (E_m^* \times H_m + E_m \times H_m^*)dxdy} \quad (4)$$

Here, $\beta_m$ shows a propagation constant of the $m^{th}$ order mode and $\kappa_{mn}$ shows a coupling coefficient between the $m^{th}$ and $n^{th}$ order modes.

Here, $\omega$ shows an angular frequency and $\varepsilon_0$ shows a vacuum permittivity. Letters $n_{bend}$ and $n_{nobend}$ show refractive index distributions in a bended state (bend) and linear state (no bend), respectively.

When solutions of formula (3) are shown in a matrix form, formulas (5) and (6) are obtained.

Formula 5

$$\begin{bmatrix} A_1(z) \\ \vdots \\ A_M(z) \end{bmatrix} = T_N \dots T_2 T_1 \begin{bmatrix} A_1(0) \\ \vdots \\ A_M(0) \end{bmatrix} = T \begin{bmatrix} A_1(0) \\ \vdots \\ A_M(0) \end{bmatrix} \quad (5)$$

Formula 6

$$T(\omega) = \sum_{i=1}^{N} T_i \quad (6)$$

Here, a transfer matrix of each of the segments is denoted as $T_i$ ($i=1, 2, \dots, N$) and a transfer matrix of the entire fiber is denoted as T (T in the formulas is in a bold letter). With the transfer matrix T, a group delay operator (GDO) is defined as the following formula (7).

Formula 7

$$GDO(\omega) = jT(\omega)^{-1} \frac{\partial T(\omega)}{\partial \omega} \quad (7)$$

An eigenvector corresponding to each eigenvalue of GDO is linear coupling of waveguide modes without perturbation, which is referred to as a principal mode. Each eigenvalue is a group delay time of the principal mode and shows a group delay time of each mode with perturbation. Principal modes are independent of a frequency to the first-order differentiation, and thus have unique characteristics such as not causing mode dispersion. The existence of principal modes has been recently confirmed experimentally (see for example J. Carpenter, et al., "First demonstration of principal modes in a multimode fibre," ECOC, PD.2.1, September 2014). Examined here is a DMGD in a state where a mode coupling exists due to micro bend using principal modes. FIGS. 8 to 12 are comparisons when $\Delta n_{eff}$ is equivalent and FIG. 13 is a comparison when $\Lambda$ is equivalent.

FIGS. 8 to 11 are graphs showing dependency of DMGD on $\sigma$ in the first to third order super-modes in a homogeneous three-core C-MCF. Here, a DMGD is defined as a difference from a group delay time of the first order super-mode without perturbation ($\sigma=0$ m$^{-1}$). Therefore, DMGD=0 ps holds with $\sigma=0$ m$^{-1}$ in the first order super-mode (mode 1). FIGS. 8 to 11 show results with a hole radius $a_2$ of 0.0 μm, 4.2 μm, 5.2 μm, and 6.2 μm, respectively.

The respective core parameters were a=6.2 μm and V=2.22. The value $\Lambda$ was set such that $\Delta n_{eff}$ equals approximately 8.37×10$^{-6}$. The length of the fiber was 1 km with the number of divided segments N=10000. In any of the cases, it is shown that the DMGDs of the first to third order super-modes converge into a certain value as σ becomes larger. That is, the differential mode group delay of the three modes became smaller and, with a large σ, became equivalent. This is because group velocity of the respective modes is averaged through a mode coupling in the fiber.

Figure 12:
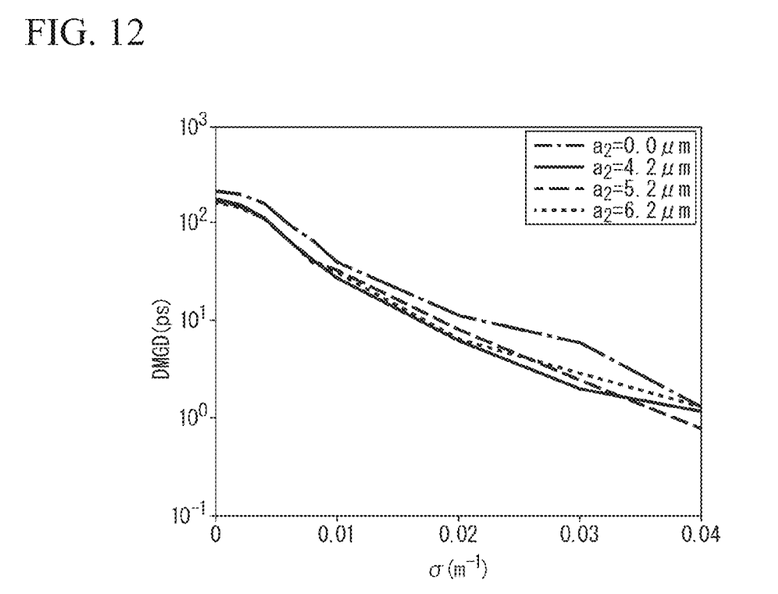
FIG. 12 is a graph showing an exemplary dependency of DMGD on $\sigma$ between a first order and third order super-modes in a homogeneous three-core C-MCF.
Figure 13:
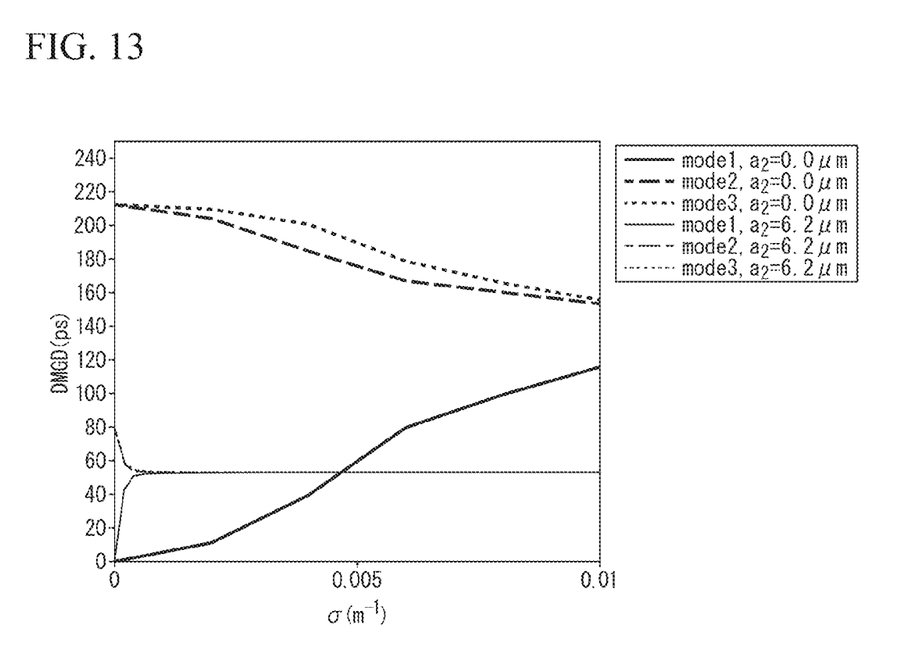
FIG. 13 is a graph showing an exemplary dependency of DMGD on $\sigma$ in first order to third order super-modes in a homogeneous three-core C-MCF.

FIG. 12 is a graph showing dependency of DMGD on σ between the first and third order modes in a homogeneous three-core C-MCF. The length of the fiber was 1 km with the number of divided segments N=10000. It is shown that, since the value $\Delta n_{eff}$ is equivalent in all fibers, variations in the DMGD are also equivalent. Note that a larger hole radius $a_2$ allows for smaller core pitch $\Lambda$.

FIG. 13 is a graph showing dependency of DMGD on σ in first to third order super-modes in a homogeneous three-core C-MCF with $\Lambda=29.0$ μm and $a_2=0.0$ μm or 6.2 μm. Here, differential effective refractive indices are $\Delta n_{eff}=8.37\times 10^{-6}$ and $3.26\times 10^{-6}$, respectively. The length of the fiber was 1 km with the number of divided segments N=10000. The case without a hole ($a_2=0.0$ μm) is similar to the case of FIG. 8. On the other hand, a differential effective refractive index $\Delta n_{eff}$ among modes in the case where the hole is added (a2=6.2 μm) becomes smaller as compared to the case without a hole ($a_2=0.0$ μm) and thus a mode coupling occurs even with smaller perturbation. That is, it is shown that, in the case of adding the hole ($a_2=6.2$ μm), DMGDs of the super-modes converge even with smaller perturbation ($\sigma<0.002$ m$^{-1}$) as compared to the case without a hole ($a_2=0.0$ μm).

In this manner, it has been made clear that adding a hole in the center of a homogeneous three-core C-MCF allows the DMGD, $\Delta n_{eff}$, and core pitch to be smaller. Also, a mode coupling considering micro bend and influence thereof on a group delay have been evaluated using the field coupling theory. This showed that large perturbation in the fiber resulted in further mitigation of a differential mode group delay.

DESCRIPTION OF THE REFERENCE SYMBOLS

- 10, 100 Multicore fiber
- 11 Core
- 12 Cladding
- 13 Low refractive index portion

The invention claimed is:

1. A multicore fiber comprising:
   two or more cores each of which is capable of single mode transmission;
   a cladding which covers the two or more cores in common; and
   a low refractive index portion which has a refractive index lower than a refractive index of the cladding, wherein
   a cross-section perpendicular to a longitudinal direction comprises a region where two or more cores of a part or all of the two or more cores are arranged in a circular shape,
   at least a part of the low refractive index portion is arranged inside an inscribed circle of the cores in the region, and
   the multicore fiber is a coupled multicore fiber in which modes of respective cores are coupled and form a super-mode.

2. The multicore fiber according to claim 1, comprising two or more regions where the two or more cores are arranged in a circular shape,
   wherein at least one of the regions comprises the low refractive index portion, and
   the two or more cores in the region are coupled.

3. The multicore fiber according to claim 1, wherein the low refractive index portion is a hole.

4. An optical cable, at least a part of the optical cable comprising the multicore fiber according to claim 1.

5. The multicore fiber according to claim 1, wherein at least the part of the low refractive index portion is arranged at the center of the inscribed circle.

* * * * *